United States Patent

Kim et al.

[11] Patent Number: 5,828,428
[45] Date of Patent: Oct. 27, 1998

[54] RESISTIVE CIRCUIT FOR A THIN FILM TRANSISTOR LIQUID CRYSTAL DISPLAY AND A METHOD FOR MANUFACTURING THE SAME

[75] Inventors: Dong-Gyu Kim; Woon-Yong Park, both of Suwon, Rep. of Korea

[73] Assignee: Samsung Electronics Co., Ltd., Kyungki-Do, Rep. of Korea

[21] Appl. No.: 593,242

[22] Filed: Jan. 29, 1996

[30] Foreign Application Priority Data

Jan. 27, 1995 [KR] Rep. of Korea .................... 1995-1529

[51] Int. Cl.$^6$ .................................................. G02F 1/1333
[52] U.S. Cl. .............................. 349/40; 349/187; 349/139
[58] Field of Search ................................. 349/40, 43, 46, 349/139, 142, 187

[56] References Cited

U.S. PATENT DOCUMENTS

| | | | |
|---|---|---|---|
| 4,789,857 | 12/1988 | Maurice | 345/206 |
| 5,019,001 | 5/1991 | Abe et al. | 445/3 |
| 5,068,748 | 11/1991 | Ukai et al. | |
| 5,187,604 | 2/1993 | Taniguchi et al. | 349/147 |
| 5,650,834 | 7/1997 | Nakagawa et al. | 349/147 |

*Primary Examiner*—William L. Sikes
*Assistant Examiner*—Kenneth Parker
*Attorney, Agent, or Firm*—Cushman Darby & Cushman IP Group of Pillsbury Madison & Sutro LLP

[57] ABSTRACT

A TFT-LCD resistive circuit provides adequate resistance through a resistive layer formed of $N^+$ amorphous silicon and silicide. A first metal layer having a shorting bar and a first is formed over the resistive layer. A passivation layer is formed over the first metal layer and patterned to expose a portion of the first metal layer over the resistive layer. A second pad is formed on the passivation layer in connecting with the first pad. The exposed portion of the first metal layer over the resistive layer is etched down to the resistive layer, using the passivation layer as a mask. Accordingly, a conventional photoresist process is not required to form the resistive circuit. The size of the resistive area is reduced while still providing adequate resistance by virtue of the $N^+$ amorphorus silicon and silicide.

8 Claims, 4 Drawing Sheets

RESISTIVE CIRCUIT FOR A THIN FILM TRANSISTOR LIQUID CRYSTAL DISPLAY AND A METHOD FOR MANUFACTURING THE SAME

BACKGROUND OF THE INVENTION

1. FIELD OF THE INVENTION

The present invention relates in general to a thin film transistor liquid crystal display (TFT-LCD), and more particularly, to a resistive circuit for a TFT-LCD which provides sufficient resistance to prevent electrostatic discharge, and a method for manufacturing this type of TFT-LCD.

2. DESCRIPTION OF THE RELATED ART

As shown in FIG. 1, in general, shorting bars 32, pads 31, and resistance 34 between lines 33 are necessary to test all the pixels of a conventional TFT-LCD and to prevent damage from electrostatic discharge.

In this structure, the shorting bars 32 must be cut during final processing. Another drawback is that the metal resistance is inadequate for large-geometry TFT-LCDs because the resistance area must be considerably large.

Further, as shown in FIG. 2, the resistance 34 can be contructed by connecting two amorphous silicon TFTs 35. However, in this configuration, it is difficult to obtain the desirable smaller area with high productivity because amorphous silicon has a lower electron mobility. Therefore, the size of the TFT must be increased considerably to obtain the resistance on the order of tens and hundreds of ohms which is necessary to prevent damage from electrostatic discharge, for example.

SUMMARY OF THE INVENTION

In view of the above, it is an object of the present invention to provide a TFT-LCD having a resistive circuit which can be fabricated with high productivity.

A further object of the present invention is to provide a TFT-LCD which provides sufficient resistance to prevent damage due to eletrostatic discharge while having a reduced resistance area.

Another object of the present invention is to provide a method for manufacturing this type of TFT-LCD.

To achieve these objects and others, according to a preferred embodiment of the present invention, a TFT-LCD resistive circuit provides adequate resistance through a resistive layer formed of $N^+$ amorphous silicon and silicide. A first metal layer having a shorting bar and a first pad is formed over the resistive layer. A passivation layer is formed over the first metal layer and patterned to expose a portion of the first metal layer over the resistive layer. A second pad is formed on the passivation layer and connecting with the first pad. The exposed portion of the first metal layer over the resistive layer is etched down to the resistive layer, using the passivation layer as a mask. Accordingly, a conventional photoresist process is not required to form the resistive circuit

DETAILED DESCRIPTION OF THE PREFERRED EMBODIMENT

A preferred embodiment of the present invention is described below with reference to the accompanying drawings.

Figure 1:
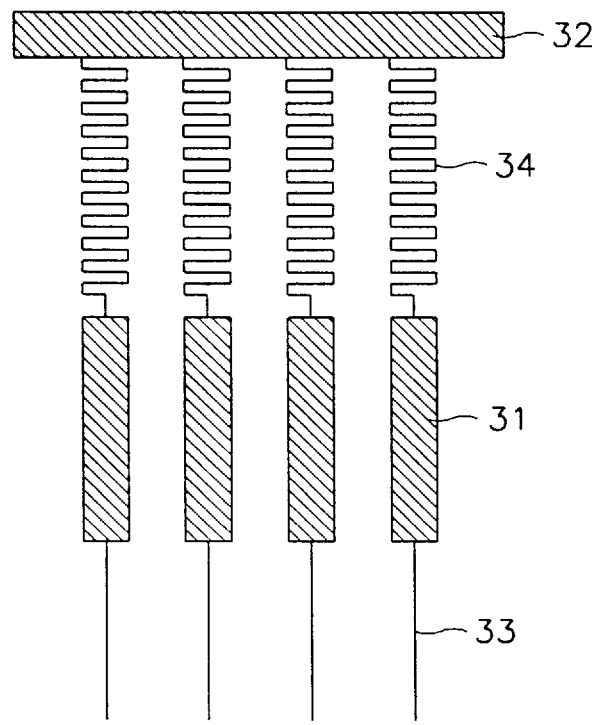
FIG. 1 is a diagram of a resistive circuit of a prior art TFT-LCD.
Figure 2:
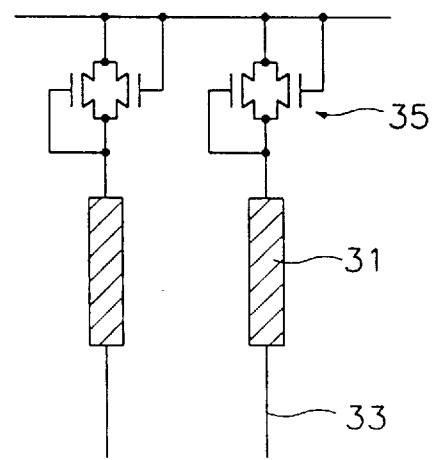
FIG. 2 is a diagram showing the construction of a resistive circuit of a prior art TFT-LCD.
Figure 3:
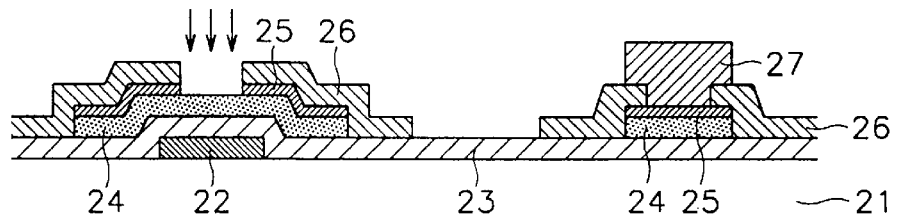
FIG. 3 is a cross-sectional view of a resistive circuit of another TFT-LCD.

Resistance formed of $N^+$ amorphous silicon or silicide can be used in TFT-LCDS. A typical TFT-LCD having such a resistance structure is shown in FIG. 3 and the fabrication process sequence of such a typical resistance is described below with reference to FIGS. 4A through 4E.

Figure 4A:
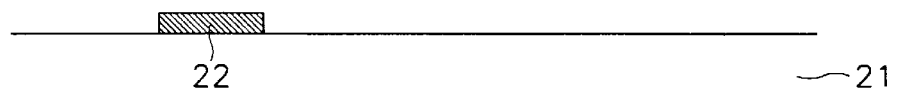
FIGS. 4A through 4E show the fabrication process sequence of the TFT-LCD of FIG. 3.

The process begins with the formation of a gate electrode 22 on a substrate 21 as shown in FIG. 4A.

Figure 4B:
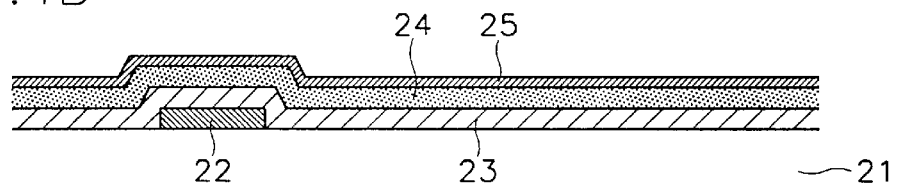

This is followed by the successive deposition of a gate insulating layer 23, an amorphous silicon layer 24 and an $N^+$ amorphous silicon layer 25, as shown in FIG. 4B.

Figure 4C:
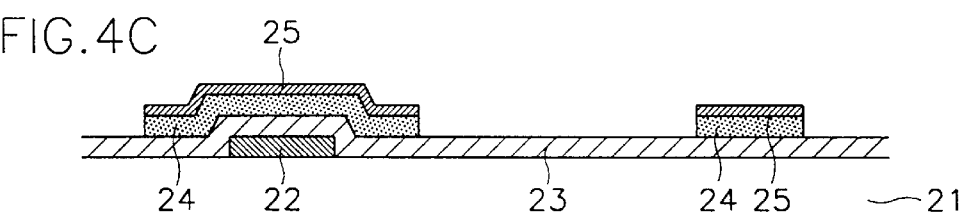

Then, as shown in FIG. 4C, in the successive layers, the amorphous silicon layer 24 and the $N^+$ amorphous silicon layer 25 are patterned at the same time. Note that this patterning process is performed at the pad.

Figure 4D:
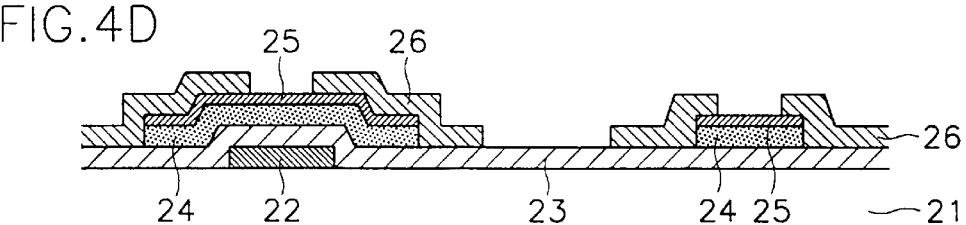

Next, as shown in FIG. 4D, metal is deposited on the patterned amorphous silicon layer 24 and $N^+$ amorphous silicon layer 25 to create a source/drain electrode 26.

Figure 4E:
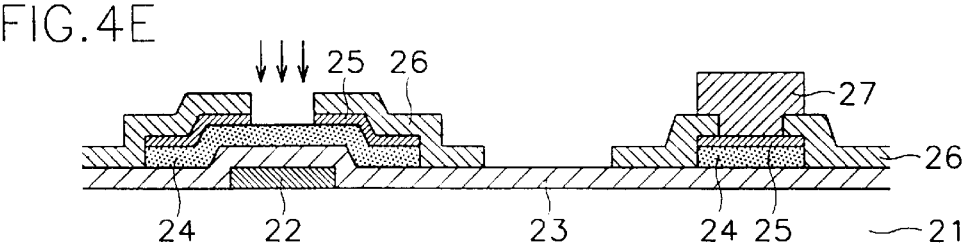

The etching process is performed at the $N^+$ amorphous silicon layer 25 on which the source/drain electrode 26 is sited, as shown in FIG. 4E. This process should be performed using a photoresist film such that the $N^+$ amorphous silicon layer 25 of the resistive circuit is not etched.

The above-mentioned method, however, increases costs and decreases yields because the additional photoresist process is required to create the resistive circuit in the TFT-LCD.

Figure 5:
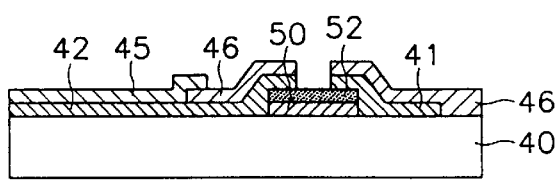
FIG. 5 is a cross-sectional view of a resistive circuit of a TFT-LCD of the present invention.

As shown in FIG. 5, a resistive circuit of the present invention features resistive layers including a patterned amorphous silicon layer 50 and a patterned $^{N+}$ amorphous silicon layer 52 formed on a substrate 40; first metal layers including a shorting bar 41 and a first pad 42 formed on the resistive layers 50 and 52; a passivation layer 46 patterned on the first metal layers 41 and 42; and a second pad 45 patterned on the passivation layer 46 to be electrically connected with the first pad 42.

FIGS. 6A through 6E and FIGS. 7A through 7E show what occurs on a substrate as the sequence of process steps according to the present invention is followed.

The sequence of process steps includes successively depositing an amorphous silicon layer 50 and an $N^+$ amorphous silicon layer 52 and patterning the deposited layers to create resistive layers; depositing a metal used to create source/drain electrodes on the resistive layers 50 and 52 and patterning the metal to create first metal layers including a shorting bar 41 and a first pad 42; depositing a passivation layer 46 on the first metal layers 41 and 42 and patterning the layer to create a contact hole 53 in the first pad 42 and an aperture 54 over the resistive layers 50 and 52; depositing ITO or transparent electrode material for pixel electrode on the passivation layer 46 and patterning the material to create a second pad 45; and etching the first metal layers on the resistive layers 50 and 52 through the aperture 54 using the passivation layer 46 as a mask.

Figure 6A:
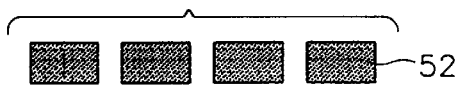
FIGS. 6A through 6E show the fabrication process sequence of the TFT-LCD of FIG. 5.

The above-mentioned method is described below in more detail with reference to FIGS. 6A through 6E and FIGS. 7A through 7E. The process begins by successively depositing an amorphous silicon layer 50 and an $N^+$ amorphous silicon layer 52 on a substrate 40 and patterning the deposited layers at the same time to create resistive layers 50 and 52 as shown in FIGS. 6A and 7A. For convenience of illustration, substrate 40 is omitted in FIGS. 6A through 6E.

Figure 6B:
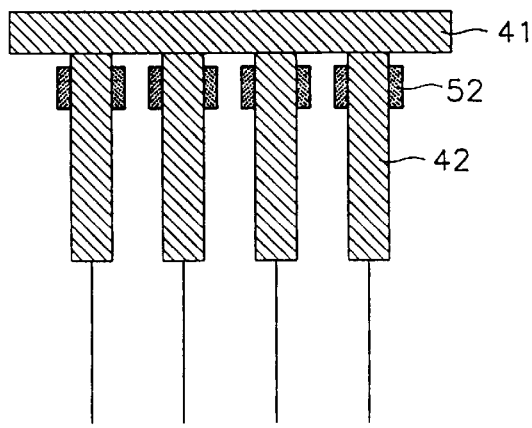
Figure 7A:
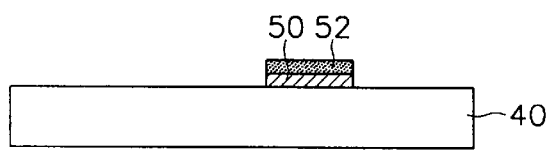
FIGS. 7A through 7E are respective cross-sectional views of FIGS. 6A through 6E.
Figure 7B:
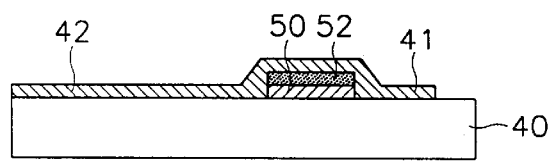

This process is followed by depositing a metal which is used for a source/drain electrode on the resistive layers 50 and 52 and patterning the deposited metal to create first metal layers including a shorting bar 41 and a pad 42, as shown in FIGS. 6B and 7B. In this process, a metal such as Cr, Ti and Mo is used.

Figure 6C:
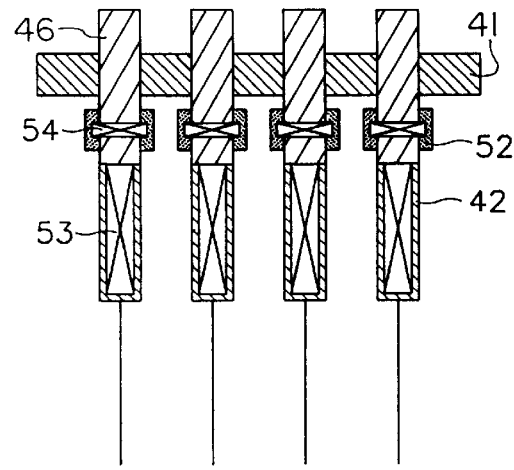
Figure 7C:
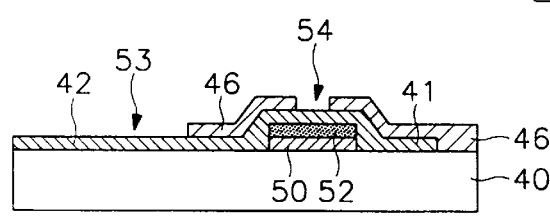

Then, as shown in FIGS. 6C and 7C, a passivation layer 46 is deposited on the first metal layers 41 and 42 and the deposited passivation layer 46 is then patterned. In this process, a contact hole 53 and an aperture 54 are patterned on the passivation layer 46.

Figure 6D:
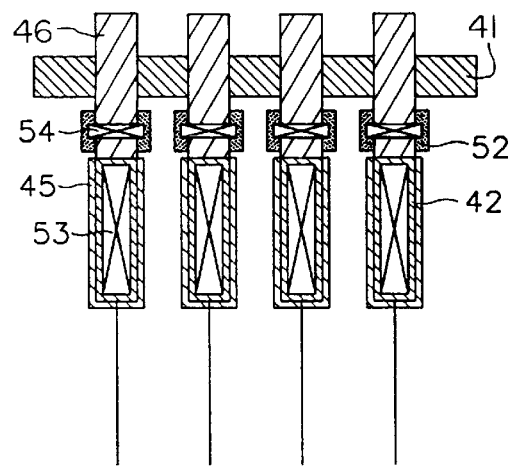
Figure 6E:
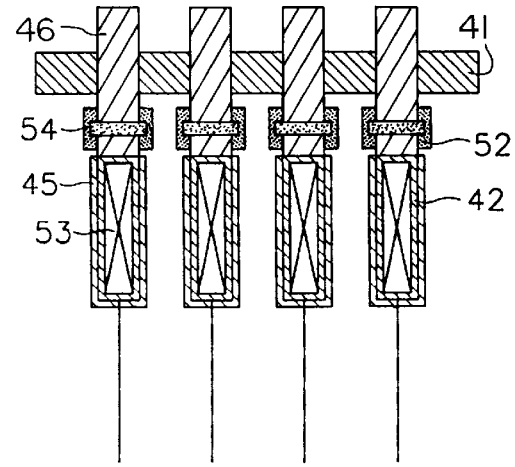
Figure 7D:
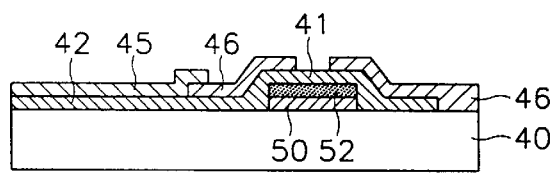
Figure 7E:
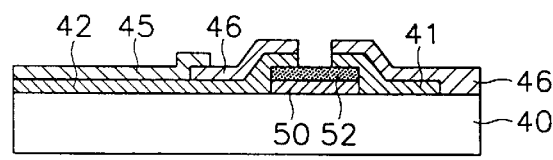

Next, as shown in FIGS. 6D and 7D, the deposition of metal such as ITO or transparent electrode material used for a pixel electrode is conducted on the passivation layer 46 and patterned the deposited metal to create a second pad 45.

The etching process is performed at the first metal layers 41 and 42 under which the resistive layers are sited using the passivation layer 46 as mask.

The main effects of the present invention are summarized in that the size of the resistive area can be reduced while still providing adequate resistance for the production of TFT-LCDs by virtue of the $N^+$ amorphous silicon and silicide. Moreover, the TFT-LCD can be fabricated without requiring any additional photoresist process. In addition, this TFT-LCD can provide sufficient resistance, in the range of tens to hundreds of ohms for example, to prevent damage due to electrostatic discharge.

Although the present invention has been described in detail with reference to the preferred embodiments thereof, those skilled in the art will appreciate that various substitutions and modifications can be made thereto without departing from the spirit and scope of the invention as set forth in the appended claims.

What is claimed is:

1. A resistive circuit of a thin film transistor liquid crystal display, comprising:

a resistive layer formed on a substrate;

a first metal layer including a shorting bar and a first pad formed on said resistive layer;

a passivation layer patterned on said first metal layer; and a second pad patterned on said passivation layer and connected with said first pad.

2. A resistive circuit according to claim 1, wherein said first metal layer is comprised of at least one of Cr, Ti and Mo.

3. A resistive circuit according to claim 1, wherein said resistive layer includes an active layer and an ohmic contact layer, said active and ohmic contact layers being comprised of the same material.

4. A resistive circuit according to claim 1, wherein said resistive layer includes an active layer and an ohmic contact layer, said active layer being comprised of amorphous silicon and said ohmic contact layer being comprised of $N^+$ amorphous silicon.

5. A resistive circuit according to claim 1, wherein said second pad is comprised of a material used to form a pixel electrode.

6. A resistive circuit according to claim 5, wherein said material used to form a pixel electrode is ITO.

7. A method for fabricating a resistive circuit of a thin film transistor liquid crystal display, comprising the steps of:

forming a resistive layer on a substrate;

forming a first metal layer on said resistive layer to create a shorting bar and a first pad;

depositing a passivation layer on said first metal layer;

patterning said passivation layer to form an aperture which exposes a portion of said first metal layer over said resistive layer;

forming a second pad on said passivation layer and connecting with said first pad; and etching said portion of said first metal layer exposed through said aperture using said passivation layer as a mask.

8. The method according to claim 7, wherein said step of forming said resistive layer includes the steps of:

depositing an amorphous silicon layer on said substrate;

depositing an $N^+$ amorphous silicon layer on said amorphous silicon layer;

patterning said amorphous silicon and said $N^+$ amorphous silicon layers to create said resistive layer.

\* \* \* \* \*